US007501475B2

(12) United States Patent
Ootuka et al.

(10) Patent No.: US 7,501,475 B2
(45) Date of Patent: Mar. 10, 2009

(54) AQUEOUS RESIN DISPERSION FOR ADHESIVE AND COMPOSITION THEREOF

(75) Inventors: Masahiko Ootuka, Yokosuka (JP); Yoshimitsu Igarashi, Kawasaki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 93 days.

(21) Appl. No.: 11/579,693

(22) PCT Filed: May 2, 2005

(86) PCT No.: PCT/JP2005/008292

§ 371 (c)(1),
(2), (4) Date: Nov. 6, 2006

(87) PCT Pub. No.: WO2005/108519

PCT Pub. Date: Nov. 17, 2005

(65) Prior Publication Data

US 2007/0225442 A1 Sep. 27, 2007

(30) Foreign Application Priority Data

May 7, 2004 (JP) ............................ 2004-138131

(51) Int. Cl.

| | |
|---|---|
| ***C08G 18/08*** | (2006.01) |
| ***C08F 8/00*** | (2006.01) |
| ***C08F 2/22*** | (2006.01) |
| ***C08F 220/12*** | (2006.01) |
| ***C08L 33/00*** | (2006.01) |
| ***C08L 33/02*** | (2006.01) |
| ***C09J 125/00*** | (2006.01) |
| ***C09J 133/02*** | (2006.01) |
| ***C09J 135/00*** | (2006.01) |
| ***C09J 175/04*** | (2006.01) |
| ***C09J 133/04*** | (2006.01) |

(52) U.S. Cl. ....................... 525/100; 525/217; 525/221; 524/589

(58) Field of Classification Search ................. 524/589; 525/100, 217, 221

See application file for complete search history.

(56) References Cited

U.S. PATENT DOCUMENTS 5,439,960 A 8/1995 Mudge et al.

FOREIGN PATENT DOCUMENTS

| | | | |
|---|---|---|---|
| JP | 2-302485 | A | 12/1990 |
| JP | 5-78843 | A | 3/1993 |
| JP | 10-195173 | A | 7/1998 |
| JP | 2001-146582 | A | 5/2001 |
| JP | 2002-121224 | A | 4/2002 |
| JP | 2002-129121 | A | 5/2002 |
| JP | 2002-155252 | A | 5/2002 |
| JP | 2003-193010 | A | 7/2003 |
| JP | 2005-330399 | A | 12/2005 |
| JP | 2005-344053 | A | 12/2005 |

OTHER PUBLICATIONS

Machine translation of JP 2002-155252.*

* cited by examiner

*Primary Examiner*—Mark Eashoo
*Assistant Examiner*—Noah Frank
(74) *Attorney, Agent, or Firm*—Birch, Stewart, Kolasch & Birch, LLP

(57) ABSTRACT

To provide a water-based polymer dispersion for isocyanate-crosslinked adhesives comprising a polymer (1) which is obtained by emulsion polymerization of a monomer composition comprising at least one monomer selected from the group consisting of an aromatic vinyl monomer and a (meth) acrylate monomer, a crosslinkable monomer, and a different monomer, in respective predetermined amounts; and a polymer (2) which is obtained by emulsion polymerization of a monomer composition comprising at least one monomer selected from the group consisting of an aromatic vinyl monomer and a (meth)acrylate monomer, a hydroxyl group-containing vinyl monomer, an ethylenically unsaturated carboxylic acid monomer, and a different monomer, in respective predetermined amounts, wherein the polymers (1) and (2) have a Tg difference of 20 to 80° C.

14 Claims, No Drawings

AQUEOUS RESIN DISPERSION FOR ADHESIVE AND COMPOSITION THEREOF

TECHNICAL FIELD

The present invention relates to a water-based polymer dispersion for adhesives excellent in dry adhesion, boiling-water-resistant adhesion, and heat-resistant adhesion, for example, suitable for adhesives for wood. More specifically, the present invention relates to a water-based polymer dispersion which is suitable for an adhesive composed of a composition containing a water soluble polymer, a water-based polymer dispersion, and an isocyanate compound and provides particularly excellent boiling-water-resistant adhesion without sacrificing the pot life of the adhesive.

BACKGROUND ART

An adhesive prepared by blending a water soluble polymer and an isocyanate compound into a water-based polymer dispersion is well known as a water-based polymer-isocyanate adhesive, which provides an extremely high adhesive strength only by a short-time pressing at normal temperature or under warming. Moreover, the adhesive has attracted attention in recent years in relation to indoor environmental issues because it does not generate formaldehyde different from conventional amino or urea resin based adhesives.

This water-based polymer-isocyanate adhesive is excellent not only in dry adhesive performance, but also in secondary performance such as water-resistant adhesion, boiling-water-resistant adhesion, and heat-resistant adhesion, and it exhibits excellent performance for the adhesion of wood. For example, it is widely used for glued lamination boards, plywood and the like. However, conventional water-based polymer-isocyanate adhesives are insufficient in water-resistant adhesion, particularly in boiling-water-resistant adhesion due to the diversification of the types of wood in recent years, although they are satisfactory in dry adhesion. Further, bonded wood may be used in an environment severer than conventional environments, for example, being left under high temperature and high humidity conditions for a long period of time. Under these circumstances, further improvement in the water-resistant adhesion and boiling-water-resistant adhesion of the water-based polymer-isocyanate adhesive is required in the market.

In addition to the requirement for the improvement in adhesion, an extension of stability (pot life) of the adhesive itself after an isocyanate compound is blended is also desired. When the improvement in adhesion is attempted, increase in the. reactivity in curing of an isocyanate compound may be a target, which is, however, not preferred because it leads to decrease in the pot life at the site of bonding. Therefore, these two points as described above, that is, improvement in adhesion and extension of pot life, are greatly desired.

With reference to these requirements, Patent Document 1 discloses an invention of a water-based polymer dispersion for wood adhesion having a core-shell structure. Patent Documents 2 and 3 each disclose an invention of a combination of a water-based polymer dispersion having a core-shell structure and an isocyanate compound.

However, Patent Document 1 does not satisfy the water-resistant adhesion and boiling-water-resistant adhesion that is required at present because a polymer in a first step is a vinyl acetate copolymer. Patent Document 2 does not satisfy the boiling-water-resistant adhesion that is required at present because a vinylester polymer is used as one of the polymers. Patent Document 3 does not satisfy the water-resistant adhesion and boiling-water-resistant adhesion that is required at present because a shell layer has a glass transition temperature of 80° C. or higher. Moreover, there is absolutely no suggestion of the extension of pot life. Thus, the requirement for the pot life that is desired is not satisfied.

Patent Document 1: JP-A-02-302485

Patent Document 2: JP-A-05-78643

Patent Document 3: JP-A-10-195173

It is an object of the present invention to provide a water-based polymer dispersion which is suitable for an adhesive composed of a composition containing a water soluble polymer, a water-based polymer dispersion, and an isocyanate compound and is excellent in water-resistant adhesion, boiling-water-resistant adhesion, and heat-resistant adhesion without sacrificing the pot life of the adhesive.

DISCLOSURE OF THE INVENTION

As a result of an investigation to solve the above-described problems, the present inventors have found a water-based polymer dispersion which has a specific glass transition temperature and comprises two types of polymers and thus have attained the present invention.

The present invention comprises the followings:

[1] A water-based polymer dispersion for isocyanate-crosslinked adhesives comprising: a polymer (1) which is obtained by emulsion polymerization of a monomer composition comprising 80 to 99.99% by mass of at least one monomer selected from the group consisting of an aromatic vinyl monomer and a (meth)acrylate monomer, 0.01 to 1% by mass of a crosslinkable monomer, and 0 to 19.99% by mass of a different monomer and has a glass transition temperature Tg of 0 to 60° C.; and a polymer (2) which is obtained by emulsion polymerization of a monomer composition comprising 80 to 99.4% by mass of at least one monomer selected from the group consisting of an aromatic vinyl monomer and a (meth)acrylate monomer, 0.5 to 5% by mass of a hydroxyl group-containing vinyl monomer, 0.1 to 5% by mass of an ethylenically unsaturated carboxylic acid monomer, and 0 to 19.0% by mass of a different monomer and has a Tg of −40 to 20° C., wherein the mass ratio of the polymer (1)/polymer (2) is 20/80 to 80/20, and the polymers (1) and (2) have a Tg difference of 20 to 80° C. and form particles having an average particle size of 200 to 600 nm.

[2] The water-based polymer dispersion for isocyanate-crosslinked adhesives according to [1], wherein the water-based polymer dispersion has a two-phase structure.

[3] The water-based polymer dispersion for isocyanate-crosslinked adhesives according to [1] or [2], wherein the polymer (1) and/or the polymer (2) is obtained by emulsion polymerization using a reactive surfactant.

[4] An adhesive composition comprising the water-based polymer dispersion for isocyanate-crosslinked, adhesives according to any one of [1] to [3] and an isocyanate compound.

[5] The water-based polymer dispersion for isocyanate-crosslinked adhesives according to [1], wherein the aromatic vinyl monomer is styrene.

[6] The water-based polymer dispersion for isocyanate-crosslinked adhesives according to [1], wherein the (meth) acrylate monomer comprises at least one monomer selected from the group consisting of butyl acrylate, 2-ethylhexyl acrylate, methyl methacrylate, butyl methacrylate, and cyclohexyl methacrylate.

[7] The water-based polymer dispersion for isocyanate-crosslinked adhesives according to [1], wherein the crosslinkable monomer comprises at least one monomer selected from the group consisting of trimethylolpropane triacrylate, trimethylolpropane trimethacrylate, γ-acryloxypropyltrimethoxysilane, and γ-methacryloxypropyltrimethoxysilane.

[8] The water-based polymer dispersion for isocyanate-crosslinked adhesives according to [1], wherein the hydroxyl group-containing vinyl monomer comprises at least one monomer selected from the group consisting of hydroxyethyl acrylate and hydroxyethyl methacrylate.

[9] The water-based polymer dispersion for isocyanate-crosslinked adhesives according to [1], wherein the ethylenically unsaturated carboxylic acid monomer comprises at least one monomer selected from the group consisting of methacrylic acid, acrylic acid, and itaconic acid.

[10] The water-based polymer dispersion for isocyanate-crosslinked adhesives according to [1], wherein the mass ratio of the polymer (1)/polymer (2) is 30/70 to 70/30.

[11] The water-based polymer dispersion for isocyanate-crosslinked adhesives according to [1], wherein the polymer (1) has a glass transition temperature Tg of 10 to 50° C.; the polymer (2) has a glass transition temperature Tg of −30 to 10° C.; and the polymers (1) and (2) have a Tg difference of 20 to 60° C.

[12] The water-based polymer dispersion for isocyanate-crosslinked adhesives according to [1], wherein the polymers (1) and (2) form particles having an average particle size of 250 to 550 nm.

As described herein the "two-phase structure" means that both the polymers (1) and (2) are present as separate phase in the same particle of the water-based polymer dispersion.

The water-based polymer dispersion for adhesives of the present invention and the adhesives obtained from the composition thereof have advantages of providing good dry adhesion, water-resistant adhesion, boiling-water-resistant adhesion, and heat-resistant adhesion without sacrificing the pot life of the adhesives.

Best Mode for Carrying Out the Invention

The present invention will be specifically described below.

The water-based polymer dispersion for isocyanate-crosslinked adhesives of the present invention (hereinafter referred to as the water-based polymer dispersion) is obtained by emulsion polymerization. A method of emulsion polymerization is not particularly limited, but conventionally known methods can be used. That is, emulsion polymerization is a method for polymerizing a monomer composition in a disperse system which comprises a monomer composition, a radical polymerization initiator, a surfactant, and optionally other additive components such as a chain transfer agent, and the like, as basic compositional components in a water-based medium.

The water-based polymer dispersion of the present invention may be obtained, for example, by obtaining each of the polymer (1) and the polymer (2) by a separate emulsion polymerization and then mixing the polymers (1) and (2). Alternatively, for example, one of the polymers (1) and (2) is first prepared by emulsion polymerization, and then the other is continuously prepared by emulsion polymerization in the presence of the first prepared polymer. Preferably, one of the polymers (1) and (2) is first prepared by emulsion polymerization, and then the other is continuously prepared by emulsion polymerization in the presence of the first prepared polymer.

Aromatic vinyl monomers used for the polymer (1) in the water-based polymer dispersion of the present invention include, for example, styrene, vinyl toluene, α-methyl styrene, and the like, preferably styrene.

(Meth)acrylate monomers used for the polymer (1) in the water-based polymer dispersion of the present invention include, for example, acrylate monomers such as methyl acrylate, ethyl acrylate, propyl acrylate, isopropyl acrylate, butyl acrylate, isobutyl acrylate, n-hexyl acrylate, cyclohexyl acrylate, 2-ethylhexyl acrylate, lauryl acrylate, benzyl acrylate, and phenyl acrylate; and methacrylate monomers such as methyl methacrylate, ethyl methacrylate, propyl methacrylate, isopropyl methacrylate, butyl methacrylate, isobutyl methacrylate, n-hexyl methacrylate, cyclohexyl methacrylate, 2-ethylhexyl methacrylate, lauryl methacrylate, benzyl methacrylate, and phenyl methacrylate, preferably butyl acrylate, 2-ethylhexyl acrylate, methyl methacrylate, butyl methacrylate, and cyclohexyl methacrylate.

Crosslinkable monomers used for the polymer (1) in the water-based polymer dispersion of the present invention include monomers having two or more radical-polymerizable double bonds and monomers having a functional group which provides a self-crosslinking structure during or after polymerization.

Monomers having two or more radical-polymerizable double bonds include, for example, aromatic compounds having two or more radical-polymerizable double bonds such as divinylbenzene; and compounds esterified with two or more (meth)acrylic acids such as polyoxyalkylene di(meth)acrylates such as polyoxyethylene diacrylate, polyoxyethylene dimethacrylate, polyoxypropylene diacrylate, and polyoxypropylene dimethacrylate; alkyldiol di(meth)acrylates such as neopentylglycol diacrylate, neopentylglycol dimethacrylate, butanediol diacrylate, and butanediol dimethacrylate; triol tri(meth)acrylates such as trimethylolpropane triacrylate, and trimethylolpropane trimethacrylate; and tetraol (meth)acrylates such as pentaerythritol tetraacrylate, and pentaerythritol tetramethacrylate.

Monomers each having a functional group which provides a crosslinking structure during or after polymerization include, for example, epoxy group-containing vinyl monomers, methylol group-containing monomers, alkoxymethyl group-containing monomers, hydrolyzable silyl group-containing vinyl monomers, and the like.

Epoxy group-containing vinyl monomers include, for example, glycidyl acrylate, glycidyl methacrylate, allylglycidyl ether, methylglycidyl acrylate, methylglycidyl methacrylate, and the like. Methylol group-containing monomers include, for example, N-methylol acrylamide, N-methylol methacrylamide, dimethylol acrylamide, dimethylol methacrylamide, and the like. Alkoxymethyl group-containing monomers include, for example, N-methoxymethyl acrylamide, N-methoxymethyl methacrylamide, N-butoxymethyl acrylamide, N-butoxymethyl methacrylamide, and the like. Hydrolyzable silyl group-containing vinyl monomers include, for example, vinylsilane, γ-acryloxypropyltrimethoxysilane, γ-acryloxypropyltriethoxysilane, γ-methacryloxypropyltrimethoxysilane, γ-methacryloxypropyltriethoxysilane, and the like. Preferred crosslinkable monomers include trimethylolpropane triacrylate, trimethylolpropane trimethacrylate, γ-acryloxypropyltrimethoxysilane, and γ-methacryloxypropyltrimethoxysilane.

In addition to the above-described monomers, monomer components other than the above-described monomers may be used for improving various qualities and physical properties required for the polymer (1) in the water-based polymer dispersion of the present invention. Monomers other than the above-described monomers include, for example, hydroxyl group-containing vinyl monomers (a), ethylenically unsaturated carboxylic acid monomers (b), amide group-containing vinyl monomers (c), cyano group-containing vinyl monomers (d), other ethylenically unsaturated monomers (e), and the like.

Hydroxyl group-containing vinyl monomers (a) include, for example, hydroxyethyl acrylate, hydroxyethyl methacrylate, hydroxypropyl acrylate, hydroxypropyl methacrylate, polyethyleneglycol acrylate, polyethyleneglycol methacrylate, and the like, preferably hydroxyethyl acrylate and hydroxyethyl methacrylate.

Ethylenically unsaturated carboxylic acid monomers (b) include, for example, ethylenically unsaturated monocarboxylic acids such as acrylic acid, methacrylic acid, a monoester of maleic acid, a monoester of fumaric acid, and a monoester of itaconic acid; ethylenically unsaturated dicarboxylic acids such as itaconic acid, fumaric acid, and maleic acid; and the like, preferably methacrylic acid, acrylic acid, and itaconic acid.

Amide group-containing vinyl monomers (c) include, for example, acrylamide, methacrylamide, N,N-methylenebisacrylamide, diacetone acrylamide, diacetone methacrylamide, maleic acid amide, maleimide, and the like.

Cyano group-containing vinyl monomers (d) include, for example, acrylonitrile, methacrylonitrile, and the like.

Further, other ethylenically unsaturated monomers (e) can also be used. For example, various vinyl monomers having a functional group such as an amino group, a sulfonic acid group, and a phosphoric acid group, vinyl acetate, vinyl propionate, vinyl versatate, vinyl pyrrolidone, methyl vinyl ketone, butadiene, ethylene, propylene, vinyl chloride, vinylidene chloride, and the like can be used as desired.

In this invention, each monomer component used for the polymer (1) may comprise one or more types of monomer.

Aromatic vinyl monomers used for the polymer (2) in the water-based polymer dispersion of the present invention include, for example, styrene, vinyl toluene, α-methyl styrene, and the like, preferably styrene.

(Meth)acrylate monomers used for the polymer (2) in the water-based polymer dispersion of the present invention include, for example, acrylate monomers such as methyl acrylate, ethyl acrylate, propyl acrylate, isopropyl acrylate, butyl acrylate, isobutyl acrylate, n-hexyl acrylate, cyclohexyl acrylate, 2-ethylhexyl acrylate, lauryl acrylate, benzyl acrylate, and phenyl acrylate; and methacrylate monomers such as methyl methacrylate, ethyl methacrylate, propyl methacrylate, isopropyl methacrylate, butyl methacrylate, isobutyl methacrylate, n-hexyl methacrylate, cyclohexyl methacrylate, 2-ethylhexyl methacrylate, lauryl methacrylate, benzyl methacrylate, and phenyl methacrylate, preferably butyl acrylate, 2-ethylhexyl acrylate, methyl methacrylate, butyl methacrylate, and cyclohexyl methacrylate.

Hydroxyl group-containing vinyl monomers used for the polymer (2) in the water-based polymer dispersion of the present invention include, for example, hydroxyethyl acrylate, hydroxyethyl methacrylate, hydroxypropyl acrylate, hydroxypropyl methacrylate, polyethyleneglycol acrylate, polyethyleneglycol methacrylate, and the like, preferably hydroxyethyl acrylate and hydroxyethyl methacrylate.

Ethylenically unsaturated carboxylic acid monomers used for the polymer (2) in the water-based polymer dispersion of the present invention include, for example, ethylenically unsaturated monocarboxylic acids such as acrylic acid, methacrylic acid, a monoester of maleic acid, a monoester of fumaric acid, and a monoester of itaconic acid; ethylenically unsaturated dicarboxylic acids such as itaconic acid, fumaric acid, and maleic acid; and the like, preferably methacrylic acid, acrylic acid, and itaconic acid.

In addition to the above-described monomers, monomer components other than the above-described monomers may be used for improving various qualities and physical properties required for the polymer (2) in the water-based polymer dispersion of the present invention. Monomers other than the above-described monomers include, for example, amide group-containing vinyl monomers (c), cyano group-containing vinyl monomers (d), other ethylenically unsaturated monomers (e), and the like.

Amide group-containing vinyl monomers (c) include, for example, acrylamide, methacrylamide, N,N-methylenebisacrylamide, diacetone acrylamide, diacetone methacrylamide, maleic acid amide, maleimide, and the like.

Cyano group-containing vinyl monomers (d) include, for example, acryionitrile, methacrylonitrile, and the like.

Further, other ethylenically unsaturated monomers (e) can also be used. For example, various vinyl monomers having a functional group such as an amino group, a sulfonic acid group, and a phosphoric acid group, vinyl acetate, vinyl propionate, vinyl versatate, vinyl pyrrolidone, methyl vinyl ketone, butadiene, ethylene, propylene, vinyl chloride, vinylidene chloride, and the like can be used as desired.

In this invention, each monomer component used for the polymer (2) may comprise one or more types of monomer.

The monomer composition of the polymer (1) in the present invention comprises 80 to 99.99% by mass of at least one monomer selected from the group consisting of an aromatic vinyl monomer and a (meth)acrylate monomer, 0.01 to 1% by mass of a crosslinkable monomer, and 0 to 19.99% by mass of any other monomer.

The water-based polymer dispersion is satisfactory in terms of boiling-water-resistant adhesion when the polymer (1) comprises 80% by mass or more of at least one monomer selected from the group consisting of an aromatic vinyl monomer and a (meth)acrylate monomer, and it is satisfactory in terms of dry adhesion when the polymer (1) comprises 99.99% mass or less of the same. The water-based polymer dispersion is satisfactory in terms of boiling-water-resistant adhesion when the polymer (1) comprises 0.01% or more by mass crosslinkable monomer, and it is satisfactory in terms of dry adhesion when the polymer (1) comprises 1% mass or less of the same. More preferably, the monomer composition of the polymer (1) comprises 85 to 99.5% by mass of at least one monomer selected from the group consisting of an aromatic vinyl monomer and a (meth)acrylate monomer, 0.05 to 0.5% by mass of crosslinkable monomer, and 0 to 19.95% by mass of any other monomer.

The monomer composition of the polymer (2) in the present invention comprises 80 to 99.4% by mass of at least one monomer selected from the group consisting of an aromatic vinyl monomer and a (meth)acrylate monomer, 0.5 to 5% by mass of a hydroxyl group-containing vinyl monomer, 0.1 to 5% by mass of an ethylenically unsaturated carboxylic acid monomer, and 0 to 19.0% by mass of any other monomer.

The water-based polymer dispersion is satisfactory in terms of boiling-water-resistant adhesion when the polymer (2) comprises 80% by mass or more of at least one monomer selected from the group consisting of an aromatic vinyl monomer and a (meth)acrylate monomer, and it is satisfactory in terms of dry adhesion when the polymer (2) comprises 99.4% mass or less of the same. The water-based polymer dispersion is satisfactory in terms of dry adhesion when the polymer (2) comprises 0.5% by mass or more of a hydroxyl group-containing vinyl monomer, and it is satisfactory in terms of boiling-water-resistant adhesion when the polymer (2) comprises 5% mass or less of the same. The water-based polymer dispersion is satisfactory in terms of dry adhesion when the polymer (2) comprises 0.1% by mass or more of an ethylenically unsaturated carboxylic acid monomer, and it is satisfactory in terms of pot life when the polymer (2) comprises 5% mass or less of the same. More preferably, the monomer composition of the polymer (2) comprises 85 to 99% by mass of at least one monomer selected from the group consisting of an aromatic vinyl monomer and a (meth)acrylate monomer, 0.5 to 4% by mass of a hydroxyl group-containing vinyl monomer, 0.1 to 4% by mass of an ethylenically unsaturated carboxylic acid monomer, and 0 to 19.0% by mass of any other monomer.

In the present invention, the mass ratio of the polymer (1) to the polymer (2) is as follows: polymer (1)/polymer (2)=20/80 to 80/20 (mass ratio). The water-based polymer dispersion is satisfactory in terms of dry adhesion when the polymer (1)/polymer (2)=20/80 (mass ratio), and it is satisfactory in terms of boiling-water-resistant adhesion when the polymer (1)/polymer (2)=80/20 (mass ratio). More preferably, the mass ratio is as follows: polymer (1)/polymer (2)=30/70 to 70/30 (mass ratio).

The polymer (1) of the present invention has a glass transition temperature of 0 to 60° C. The water-based polymer dispersion is satisfactory in terms of dry adhesion when the polymer (1) has a glass transition temperature of 0° C. or higher, and it is satisfactory in terms of boiling-water-resistant adhesion when the polymer (1) has a glass transition temperature of 60° C. or lower. Preferably, the polymer (1) has a glass transition temperature of 10 to 50° C.

The polymer (2) of the present invention has a glass transition temperature of −40 to 20° C. The water-based polymer dispersion is satisfactory in terms of heat-resistant adhesion when the polymer (2) has a glass transition temperature of −40° C. or higher, and it is satisfactory in terms of boiling-water-resistant adhesion when the polymer (2) has a glass transition temperature of 20° C. or lower. Preferably, the polymer (2) has a glass transition temperature of −30 to 10° C.

The polymers (1) and (2) of the present invention have a glass transition temperature difference of 20 to 80° C. The water-based polymer dispersion is satisfactory in terms of heat-resistant adhesion when the difference is 20° C. or more, and it is satisfactory in terms of boiling-water-resistant adhesion when the difference is 80° C. or less. Preferably, the polymers (1) and (2) have a glass transition temperature difference of 20 to 60° C.

As described herein "glass transition temperature of a polymer" can be defined by the following formula from the glass transition temperature of a homopolymer of each monomer and the copolymerization ratio of each monomer.

$$1/Tg=W1/Tg1+W2/Tg2+$$

Tg: glass transition temperature (° K) of a polymer composed of monomer 1, monomer 2, . . .

W1, W2, . . . : mass fraction of monomer 1, monomer 2, . . . (wherein W1+W2+ . . . =1

Tg1, Tg2, . . . : glass transition temperature (° K) of a homopolymer of monomer 1, monomer 2, . . .

The glass transition temperature (° K) of a homopolymer of a monomer used for the calculation is described, for example, in the Polymer Handbook (John Wiley & Sons). Numerical values used in the present application are illustrated below (wherein the numbers in the parentheses show the glass transition temperature of a homopolymer): polystyrene (373° K), polymethyl methacrylate (378° K), polybutyl acrylate (219° K), poly(2-ethylhexyl acrylate) (205° K), polyacrylic acid (379° K), polymethacrylic acid (403° K), polyacrylonitrile (373° K), poly(2-hydroxyethyl acrylate) (258° K), and poly (2-hydroxyethyl methacrylate) (328° K).

Radical polymerization initiators used in the present invention are radically decomposed by heat or reducing substances to start addition polymerization of monomers. Both inorganic and organic initiators can be used as the initiators. Water soluble and oil soluble polymerization initiators can be used as these initiators. Water soluble polymerization initiators include, for example, peroxodisulfates, peroxides, water soluble azobis compounds, a redox system consisting of a peroxide and a reducing agent, and the like. Peroxodisulfates include, for example, potassium peroxodisulfate (KPS), sodium peroxodisulfate (NPS), ammonium peroxodisulfate (APS), and the like. Peroxides include, for example, hydrogen peroxide, t-butyl hydroperoxide, t-butyl peroxymaleic acid, succinic acid peroxide, benzoyl peroxide, and the like. Water soluble azobis compounds include, for example, 2,2-azobis(N-hydroxyethyl isobutylamide), 2,2-azobis(2-amidinopropane)2hydrochloride, 4,4-azobis(4-cyanopentanoic acid), and the like. The redox system consisting of a peroxide and a reducing agent which can be used include, for example, a combination of any of the above-described peroxides with a reducing agent such as sodium sulfoxylate formaldehyde, sodium hydrogen sulfite, sodium thiosulfate, sodium hydroxymethanesulfinate, erythorbic acid, sodium erythorbate, L-ascorbic acid, sodium L-ascorbate, cuprous salts, and ferrous salts.

The amount of a radical polymerization initiator which can be used is 0.05 to 1 part by mass of the radical polymerization initiator based on 100 parts by mass of the monomer composition.

The surfactant used in the emulsion polymerization of the present invention refer to compounds having at least one or more hydrophilic groups and one or more lipophilic groups. A so-called "nonreactive" surfactant having no ethylenic double bond is suitably used as the above surfactant because it can be industrially easily used. Further, in order to improve boiling-water-resistance, it is also preferred to use a so-called "reactive" surfactant having at least one or more ethylenic double bonds in one molecule. A "nonreactive" surfactant and a "reactive" surfactant may be used in combination. These surface active agents may be used in combination of one or more thereof.

Nonreactive surfactant include anionic surfactant and nonionic surfactant. Nonreactive anionic surfactant include, for example, alkyl sulfates, polyoxyethylene alkylether sulfates, alkylbenzene sulfonates, alkylnaphthalene sulfonates, alkyl sulfosuccinates, alkyl diphenylether disulfonates, naphthalenesulfonic acid-formaldehyde condensates, polyoxyethylene polycyclic phenyl ether sulfates, polyoxyethylene distyrenated phenyl ether sulfates, fatty acid salts, alkylphosphates, polyoxyethylene alkylphenyl ether sulfates, and the like. Nonreactive nonionic surfactant include, for example, polyoxyethylene alkyl ethers, polyoxyalkylene alkyl ethers, polyoxyethylene polycyclic phenyl ethers, polyoxyethylene distyrenated phenyl ethers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, alkyl alkanolamides, polyoxyethylene alkylphenyl ethers, and the like.

Anionic surfactant among reactive surfactant include, for example, ethylenic unsaturated monomers each having a sulfonic acid group, a sulfonate group, or a sulfate group, or a salt thereof. Particularly preferred is a compound having a sulfonic acid group, or a group that is an ammonium salt or an alkali metal salt thereof (an ammonium sulfonate group or an alkali metal sulfonate group). Reactive anionic surfactant include, for example, alkyl allyl sulfosuccinates (ELEMINOL (trademark) JS-2, and JS-5 from Sanyo Chemical Industries; LATEMUL (trademark) S-120, S-180A, S-180, etc. manufactured by Kao Corporation; polyoxyethylene alkyl propenylphenyl ether sulfates (AQUARON (trademark) HS-10 etc. manufactured by Dai-Ichi Kogyo Seiyaku Co., Ltd.); α-[1-[(allyloxy)methyl]-2-(nonylphenoxy)ethyl]-ω-polyoxyethylene sulfates (ADEKA Reasoap (trademark) SE-1025N etc. manufactured by Asahi Denka Kogyo K.K.); ammonium α-sulfonate-ω-1-(allyloxymethyl)alkyloxy polyoxyethylene (AQUARON KH-10 etc. manufactured by Dai-Ichi Kogyo Seiyaku Co., Ltd.); styrene sulfonates; and the like.

Further, nonionic surfactant among reactive surfactant include, for example, α-[1-[(allyloxy)methyl]-2-(nonylphenoxy)ethyl]-ω-hydroxypolyoxyethylenes (ADEKA Reasoap NE-20, NE-30, NE-40, etc. manufactured by Asahi Denka Kogyo K.K.); polyoxyethylene alkyl propenylphenyl ether (AQUARON RN-10, RN-20, RN-30, RN-50, etc. manufactured by Dai-Ichi Kogyo Seiyaku Co., Ltd.); and the like.

The amount of a nonreactive surfactant and/or a reactive surfactant which can be used is 0.1 to 5 part by mass of an anionic surfactant or 0.1 to 5 parts by mass of a nonionic surfactant based on 100 parts by mass of the monomer composition.

Surfactant may be added either before polymerization, or during polymerization, or after polymerization.

Chain transfer agents include, for example, mercaptans such as n-butyl mercaptan, t-butyl mercaptan, n-octyl mercaptan, n-lauryl mercaptan, and n-dodecyl mercaptan; disulfides such as tetramethylthiuram disulfide; halogenated derivatives such as carbon tetrachloride; α-methyl styrene dimers; and the like. They can be used singly or in combination of two or more. The preferred one is n-dodecyl mercaptan.

The amount of the chain transfer agent used in the emulsion polymerization of the present invention is 0 to 1 part by mass of the chain transfer agent based on 100 parts by mass of the monomer composition.

The polymerization temperature in the emulsion polymerization of the present invention is typically selected in the range of 60 to 100° C., but polymerization may also be performed in a lower temperature range of 20 to 40° C. by using a redox polymerization method or the like.

The water-based polymer dispersion of the present invention has particles with an average particle size of 200 to 600 nm. The water-based polymer dispersion is satisfactory in terms of pot life when the average particle size is 200 nm or more and is satisfactory in terms of adhesion when it is 600 nm or less. The average particle size is preferably from 250 to 550 nm, more preferably from 300 to 500 nm. As described herein the term "average particle size" means the volume average particle size as measured by a light scattering method using, for example, a particle size measurement instrument (MICROTRACTMUPA150 manufactured by LEED & NORTHRUP Company).

A method for controlling the particle size for the water-based polymer dispersion of the present invention is not particularly limited. For example, it can be controlled by the percent amount used of seed particles or surfactant. The seed particles as described herein provide a site of polymerization in the emulsion polymerization and are finally contained in the polymer of the present invention. Generally, the higher the percent amount used of seed particles or surfactants, the smaller the average particle size of a copolymer latex produced, and the lower the percentage, the larger the average particle size. The seed particles may be prepared by polymerization in the same reactor before it is used for the polymerization of the water-based polymer dispersion of the present invention. Alternatively, seed particles prepared by polymerization in a different reactor may be used. Further, the surfactant is used in such a manner that it is charged into a reactor before polymerization.

Basic compounds may be contained in the water-based polymer dispersion of the present invention in order to adjust pH. The basic compounds include, for example, basic alkali metal compounds and amines. Basic alkali metal compounds include, for example, hydroxides, hydrogencarbonates, carbonates, and organic carboxylates of alkali metals, and the like. Alkali metal hydroxides include, for example, lithium hydroxide, sodium hydroxide, potassium hydroxide, and the like. Alkali metal hydrogencarbonates and carbonates include, for example, sodium hydrogencarbonate, sodium carbonate, potassium hydrogencarbonate, potassium carbonate, and the like. Organic carboxylates of alkali metals include, for example, sodium acetate, sodium oxalate, sodium benzoate, and the like. Amines include, for example, ammonia, dimethylaminoethanol, and the like.

The content of the basic compounds is selected such that pH of the water-based polymer dispersion is adjusted in the range of 4 to 12, preferably in the range of 5 to 10.

The solid content of the water-based polymer dispersion of the present invention is preferably from 30 to 70% by mass.

Isocyanate compounds for use in the present invention may be any isocyanate compound having two or more isocyanate groups in one molecule and include, for example, tolylene diisocyanate, hydrogenated tolylene diisocyanate, triphenylmethane triisocyanate, methylenebisdiphenyl diisocyanate, polymethylene phenyl polyisocyanate, hydrogenated methylenebisdiphenyl diisocyanate, xylene diisocyanate, hexamethylene diisocyanate, and the like. Further, the isocyanate compounds may be isocyanate polymers obtained by previously reacting water, polyhydric alcohols, hydroxy group-containing polyethers, or hydroxy group-containing polyesters with excess amount of isocyanate compounds. The isocyanate compounds are preferably hydrophobic isocyanate compounds, more preferably tolylene diisocyanate, methylenebisdiphenyl diisocyanate, polymethylene phenyl polyisocyanate, and polymers thereof.

The isocyanate compounds are used in an amount of 1 to 150 parts by mass based on 100 parts by mass of the solid content of the water-based polymer dispersion. The water-based polymer dispersion has improved boiling-water-resistant adhesion and heat-resistant adhesion when the isocyanate compound is contained in an amount of 1 part by mass or more, and it is satisfactory in terms of pot life when the isocyanate compound is contained in an amount of 150 parts by mass or less. More preferably, the isocyanate compound is contained in an amount of 2 to 100 parts by mass.

In order to improve the performance, the water-based polymer dispersion of the present invention and the composition thereof may be blended with, for example, water soluble polymers, latices and emulsions other than those of the present invention, solvents, plasticizers, antifoaming agents, thickeners, leveling agents, dispersants, colorants, water resistant additives, lubricants, pH adjusters, antiseptics, inorganic pigments, organic pigments, surfactant, crosslinking agents other than isocyanate compounds (for example, epoxy compounds and polyvalent metal compounds), and the like.

Water soluble polymers used for the present invention include, for example, polyvinyl alcohols such as polyvinyl alcohol, ethylene polyvinyl alcohol, and silanol-modified polyvinyl alcohol, cellulose derivatives (methylcellulose, ethylcellulose, hydroxycellulose, carboxycellulose, etc.), chitin, chitosan, starches, polyethylene glycol, polypropylene glycol, polyvinyl ether, gelatin, caseins, cyclodextrins, aqueous nitrocellulose, and the like. Polyvinyl alcohols may be formed by complete or partial saponification. Among others, polyvinyl alcohols are preferred.

Latices and emulsions other than those of the present invention include, for example, vinyl acetate emulsion, ethylene-vinyl acetate emulsion, urethane emulsion, styrene-butadiene latex, acrylonitrile-butadiene latex, and the like. Further, water-redispersible polymer powders may be blended.

As inorganic or organic pigments, examples of various inorganic pigments include metal oxides, hydroxides, sulfides, carbonates, sulfates, or silicate compounds of magnesium, calcium, zinc, barium, titanium, aluminum, antimony, lead and the like, specifically, for example, calcium carbonate, kaolin, talc, titanium dioxide, aluminum hydroxide, silica, gypsum, baryta powder, alumina white, satin white, and the like; and examples of organic pigments include fine solid-polymer powders of polystyrene, polyethylene, polyvinyl chloride, and the like.

EXAMPLES

The present invention will be described in accordance with Examples but is not limited to them. The parts (parts by mass) in Examples represent the parts as it is (that is, the parts represent a water-based polymer dispersion containing water as it is).

Each of the properties was determined in the manner as described below.

(1) Average Particle Size:

Average particle size was measured by a light scattering method. A particle size measurement instrument (MICROTRACTMUPA150 manufactured by LEED & NORTHRUP Company) was used as a measurement instrument to measure a volume average particle size.

(2) Pot Life

The main ingredient having the composition as shown below in an amount of 100 parts by mass was blended with 10 to 25 parts by mass of MR-100 (polymethylene phenyl polyisocyanate manufactured by Nippon Polyurethane Industry Co., Ltd.) as an isocyanate compound and vigorously stirred for five minutes.

Then, the mixture was allowed to stand at 20° C. to observe the time before it gels. The gel time of 90 minutes or more is regarded as acceptable. When the mixture was lightly stirred with a spatula every 15 minutes, the mixture became impossible to stir at a point of time, which was regarded as the time point of gelation. Composition of the main ingredient:

| | |
|---|---|
| Water-based polymer dispersion (solid content 50%) | 60 parts by mass |
| Polyvinyl alcohol (solid content 15%) | 20 parts by mass |
| Calcium carbonate | 20 parts by mass |

PVA 217 manufactured by Kuraray Co., Ltd. was used as the polyvinyl alcohol. The main ingredient was prepared according to the following method. Calcium carbonate was first charged into the emulsion of the water-based polymer dispersion while the latter was being stirred, and the mixture was stirred for 10 minutes. Then, the polyvinyl alcohol was added to the mixture while the latter was being stirred, and the resulting mixture was stirred for additional 10 minutes.

(3) Adhesion Test (Compression Shear Adhesion)

a. Dry adhesion: The composition used for the pot life test in (2) was used as an adhesive (used within 10 minutes after the isocyanate was mixed). Preparation of specimens and conditions of adhesion test were in conformity with JIS K6806:2003 5. 11. 1. However, the specimens were allowed to stand still for 14 days after removing pressure.

b. Cyclic boiling test: Preparation of specimens and conditions of adhesion test were in conformity with JIS K6806:2003 5. 11. 1. However, the condition for immersion of specimens in boiling water was as follows. The specimens were immersed in boiling water for four hours, then dried in air at 60±3° C. for 20 hours, and further immersed in boiling water for four hours. Subsequently, the specimens were dried again in air at 60±3° C. for 20 hours, further immersed in boiling water for four hours, and then subjected to adhesion test in a state where they were wet.

c. Heat-resistant adhesion: Specimens prepared in conformity with JIS K6806:2003 5. 11. 1 were allowed to stand in an environment at 120° C. for 120 hours, then allowed to stand at 20° C. for 24 hours, and then subjected to adhesion test.

Water-based polymer dispersions 1 to 16 were obtained using monomer compositions shown in Tables 1 and 2 according to a specific method as described below.

To a first-stage monomer composition shown in Tables 1 and 2, were added 25 parts by mass of a 20% aqueous solution of EMULGEN 150 (polyoxyethylene alkyl ether manufactured by Kao Corporation), 40 parts by mass of a 25% aqueous solution of EMAL D-3-D (sodium polyoxyethylene alkyl ether sulfate manufactured by Kao Corporation), 1.2 parts by mass of ammonium peroxodisulfate, and 220 parts by mass of water, and then the resulting mixture was stirred with a homomixer to prepare a pre-emulsified liquid.

Further, a pre-emulsified liquid of a second-stage monomer composition was prepared in the same manner as that of the first-stage monomer composition.

Separately, into a polymerization reactor equipped with a stirring device and a jacket for controlling temperature, were charged 5.2 parts by mass of seed particles (average particle size of 50 nm, a copolymer of methyl methacrylate/butyl acrylate=50/45 (mass ratio), solid content of 35%) in the case of water-based polymer dispersions 1 to 8 and 13 to 16, and 400 parts by mass of water, and the temperature inside the reactor was raised to 80° C. Then, to the mixture was added an aqueous solution prepared by dissolving 0.5 part by mass of ammonium peroxodisulfate in 50 parts by mass of water. Five minutes after the addition, the above-described first stage pre-emulsified liquid was added to the resulting mixture at a constant flow rate over two hours. Polymerization was continued for 0.5 hour at the same temperature. Then, the second stage pre-emulsified liquid was added at a constant rate over two hours. Polymerization was continued for one hour at the same temperature, and the reaction mixture was cooled.

Subsequently, to the cooled mixture, was added a 10% aqueous sodium hydroxide solution to adjust the pH to 6. The resulting mixture was filtered with a wire net of 200 meshes and mixed with water such that it had a solid content of 50%, thus obtaining a water-based polymer dispersion.

In the case of water-based polymer dispersions 9 and 10, the seed particles having an average particle size of 50 nm as described above were added in an amount of 8.0 parts by mass and 0.9 part by mass, respectively.

In the case of water-based polymer dispersions 11 and 12, the seed particles having different average particle sizes were used. That is, in the case of the water-based polymer dispersion 11, were used seed particles of a copolymer of methyl methacrylate/butyl acrylate=50/45 (mass ratio) having an average particle size of 35 nm and a solid content of 35%. In the case of the water-based polymer dispersion 12, were used seed particles of a copolymer of methyl methacrylate/butyl acrylate=50/45 (mass ratio) having an average particle size of 80 nm and a solid content of 35%.

Examples 1 to 12

The water-based polymer dispersions described in Tables 1-1 and 1-2 were used to prepare the main ingredients of the above-described composition, which were used for the performance evaluations. Tables 3-1 and 3-2 show various information together with the results of the evaluations.

Comparative Examples 1 to 6

The water-based polymer dispersions described in Table 2 were used to prepare the main ingredients of the above-described composition, which were used for the performance evaluations in the same manner as in Examples. Table 4 shows various information together with the results of the evaluations.

TABLE 1

| | | Water-based polymer dispersion | | | | | | | | | |
|---|---|---|---|---|---|---|---|---|---|---|---|
| | | 1 | | 2 | | 3 | | 4 | | 5 | |
| | | 1st stage | 2nd stage | 1st stage | 2nd stage | 1st stage | 2nd stage | 1st stage | 2nd stage | 1st stage | 2nd stage |
| Seed particles (parts by mass) | | 5.2 | | 5.2 | | 5.2 | | 5.2 | | 5.2 | |
| Monomer composition | St (parts by mass) | 100 | 100 | 150 | 100 | 150 | 50 | 0 | 0 | 0 | 0 |
| | MMA (parts by mass) | 230 | 85 | 210 | 85 | 210 | 85 | 330 | 185 | 330 | 170 |
| | BA (parts by mass) | 168.5 | 300 | 138.5 | 300 | 138.5 | 350 | 168.5 | 300 | 168.5 | 300 |
| | HEMA (parts by mass) | 1 | 10 | 1 | 10 | 1 | 10 | 1 | 10 | 1 | 20 |
| | MAA (parts by mass) | 0 | 5 | 0 | 5 | 0 | 5 | 0 | 5 | 0 | 10 |
| | TMPTA (parts by mass) | 0.5 | 0.1 | 0.5 | 0.1 | 0.5 | 0.1 | 0.5 | 0.1 | 0.5 | 0.1 |
| Physical properties | Tg (° C.) | 30 | −10 | 40 | −10 | 40 | −20 | 30 | −10 | 30 | −10 |
| | Average particle size (nm) | 395 | | 400 | | 407 | | 404 | | 410 | |

| | | Water-based polymer dispersion | | | | | | | | | |
|---|---|---|---|---|---|---|---|---|---|---|---|
| | | 6 | | 7 | | 8 | | 9 | | 10 | |
| | | 1st stage | 2nd stage | 1st stage | 2nd stage | 1st stage | 2nd stage | 1st stage | 2nd stage | 1st stage | 2nd stage |
| Seed particles (parts by mass) | | 5.2 | | 5.2 | | 5.2 | | 8.0 | | 0.9 | |
| Monomer composition | St (parts by mass) | 0 | 100 | 130 | 0 | 80 | 90 | 100 | 100 | 100 | 100 |
| | MMA (parts by mass) | 170 | 220 | 250 | 130 | 130 | 195 | 230 | 85 | 230 | 85 |
| | BA (parts by mass) | 315 | 178.5 | 218.5 | 255 | 89.5 | 400 | 168.5 | 300 | 168.5 | 300 |
| | HEMA (parts by mass) | 10 | 1 | 1 | 10 | 1 | 10 | 1 | 10 | 1 | 10 |
| | MAA (parts by mass) | 5 | 0 | 0 | 5 | 0 | 5 | 0 | 5 | 0 | 5 |
| | TMPTA (parts by mass) | 0.1 | 0.5 | 0.5 | 0.1 | 0.5 | 0.1 | 0.5 | 0.1 | 0.5 | 0.1 |
| Physical properties | Tg (° C.) | −15 | 25 | 25 | −15 | 35 | −5 | 30 | −10 | 30 | −10 |
| | Average particle size (nm) | 397 | | 392 | | 411 | | 261 | | 525 | |

St: styrene,
MMA: methyl methacrylate,
BA: butyl acrylate,
HEMA: 2-hydroxyethyl methacrylate
MAA: methacrylic acid,
TMPTA: trimethylolpropane triacrylate
Tg: glass transition temperature (calculated)

TABLE 2

| | | Water-based polymer dispersion | | | | | | | | | | | |
|---|---|---|---|---|---|---|---|---|---|---|---|---|---|
| | | 11 | | 12 | | 13 | | 14 | | 15 | | 16 | |
| | | 1st stage | 2nd stage | 1st stage | 2nd stage | 1st stage | 2nd stage | 1st stage | 2nd stage | 1st stage | 2nd stage | 1st stage | |
| Seed particles (parts by mass) | | 10 | | 1 | | 5.2 | | 5.2 | | 5.2 | | 5.2 | |
| Monomer composition | St (parts by mass) | 100 | 100 | 100 | 100 | 100 | 100 | 100 | 100 | 190 | 50 | 120 | 120 |
| | MMA (parts by mass) | 230 | 85 | 230 | 85 | 230 | 85 | 230 | 100 | 220 | 50 | 140 | 140 |
| | BA (parts by mass) | 168.5 | 300 | 168.5 | 300 | 169 | 300 | 168.5 | 300 | 88.5 | 395 | 224.5 | 224.5 |
| | HEMA (parts by mass) | 1 | 10 | 1 | 10 | 1 | 10 | 1 | 0 | 1 | 10 | 10 | 10 |
| | MAA (parts by mass) | 0 | 5 | 0 | 5 | 0 | 5 | 0 | 0 | 0 | 5 | 5 | 5 |
| | TMPTA (parts by mass) | 0.5 | 0.1 | 0.5 | 0.1 | 0 | 0 | 0.5 | 0.1 | 0.5 | 0.1 | 0.5 | 0.5 |
| Physical properties | Tg (° C.) | 30 | −10 | 30 | −10 | 30 | −10 | 30 | 10 | 60 | −30 | 10 | 10 |
| | Average particle size (nm) | 163 | | 780 | | 403 | | 392 | | 390 | | 404 | |

St: styrene,
MMA: methyl methacrylate,
BA: butyl acrylate,
HEMA: 2-hydroxyethyl methacrylate
MAA: methacrylic acid,
TMPTA: trimethylolpropane triacrylate
Tg: glass transition temperature (calculated)

TABLE 3

| | Examples | | | | | |
|---|---|---|---|---|---|---|
| | 1 | 2 | 3 | 4 | 5 | 6 |
| Main ingredient composition (parts by mass) | 100 | 100 | 100 | 100 | 100 | 100 |
| (Water-based polymer dispersion No.) | (1) | (2) | (3) | (4) | (5) | (6) |
| Isocyanate (parts by mass) | 15 | 15 | 15 | 15 | 15 | 15 |
| Pot life (minutes) | 90 or more | 90 or more | 90 or more | 90 or more | 90 or more | 90 or more |
| Dry adhesion (N/cm$^2$) | 2002 | 2009 | 1995 | 2005 | 2000 | 1998 |
| Boiling-water-adhesion (N/cm$^2$) | 1065 | 997 | 1106 | 984 | 1034 | 1209 |
| Heat-resistant adhesion (N/cm$^2$) | 1823 | 1879 | 1811 | 1796 | 1874 | 1848 |

| | Examples | | | | | |
|---|---|---|---|---|---|---|
| | 7 | 8 | 9 | 10 | 11 | 12 |
| Main ingredient composition (parts by mass) | 100 | 100 | 100 | 100 | 100 | 100 |
| (Water-based polymer dispersion No.) | (7) | (8) | (9) | (10) | (1) | (1) |
| Isocyanate (parts by mass) | 15 | 15 | 15 | 15 | 10 | 25 |
| Pot life (minutes) | 90 or more | 90 or more | 90 or more | 90 or more | 90 or more | 90 or more |
| Dry adhesion (N/cm$^2$) | 1987 | 1890 | 2010 | 1902 | 1870 | 2004 |
| Boiling-water-adhesion (N/cm$^2$) | 972 | 1052 | 1285 | 958 | 966 | 1168 |
| Heat-resistant adhesion (N/cm$^2$) | 1844 | 1794 | 1820 | 1752 | 1590 | 1843 |

TABLE 4

| | Comparative Examples | | | | | |
|---|---|---|---|---|---|---|
| | 1 | 2 | 3 | 4 | 5 | 6 |
| Main ingredient composition (parts by mass) | 100 | 100 | 100 | 100 | 100 | 100 |
| (Water-based polymer dispersion No.) | (11) | (12) | (13) | (14) | (15) | (16) |
| Isocyanate (parts by mass) | 15 | 15 | 15 | 15 | 15 | 15 |
| Pot life (minutes) | 45 | 90 or more | 90 or more | 90 or more | 90 or more | 90 or more |
| Dry adhesion (N/cm$^2$) | 1896 | 1999 | 1955 | 1859 | 1830 | 1915 |
| Boiling-water-adhesion (N/cm$^2$) | 1089 | 602 | 598 | 712 | 575 | 784 |
| Heat-resistant adhesion (N/cm$^2$) | 1474 | 1206 | 987 | 1065 | 900 | 1034 |

INDUSTRIAL APPLICABILITY

The water-based polymer dispersion of the present invention and the composition thereof are suitable for adhesives for wood such as plywood and glued lamination boards. They are also suitably applicable as adhesives, for example, for particle boards, for corrugated fiberboards, for metal foil adhesion, for paper, for fabric, for fiber processing, for ceramics, for inorganic boards, for plastic sheets of polyvinyl chloride, polypropylene and the like, for glass plates, and the like.

The invention claimed is:

1. A water-based polymer dispersion for isocyanate-crosslinked adhesives comprising:

a polymer (1) which is obtained by emulsion polymerization of a monomer composition comprising 80 to 99.99% by mass of at least one monomer selected from the group consisting of an aromatic vinyl monomer and a (meth)acrylate monomer, 0.01 to 1% by mass of a crosslinkable monomer, and 0 to 19.99% by mass of a different monomer and has a glass transition temperature Tg of 10 to 40° C.; and a polymer (2) which is obtained by emulsion polymerization of a monomer composition comprising 80 to 99.4% by mass of at least one monomer selected from the group consisting of an aromatic vinyl monomer and a (meth) acrylate monomer, 0.5 to 5% by mass of a hydroxyl group-containing vinyl monomer, 0.1 to 5% by mass of an ethylenically unsaturated carboxylic acid monomer, and 0 to 19.0% by mass of a different monomer and has a Tg of −30 to 10° C., wherein the mass ratio of the polymer (1)/polymer (2) is 20/80 to 80/20, and the polymers (1) and (2) have a Tg difference of 20 to 60° C. and form particles having an average particle size of 200 to 600 nm.

2. The water-based polymer dispersion for isocyanate-crosslinked adhesives according to claim 1, wherein the water-based polymer dispersion has a two-phase structure.

3. An adhesive composition comprising the water-based polymer dispersion for isocyanate-crosslinked adhesives according to claim 2 and an isocyanate compound.

4. The water-based polymer dispersion for isocyanate-crosslinked adhesives according to claim 1 or 2, wherein the polymer (1) and/or the polymer (2) is obtained by emulsion polymerization using a reactive surfactant.

5. An adhesive composition comprising the water-based polymer dispersion for isocyanate-crosslinked adhesives according to claim 4 and an isocyanate compound.

6. An adhesive composition comprising the water-based polymer dispersion for isocyanate-crosslinked adhesives according to claim 1 and an isocyanate compound.

7. The water-based polymer dispersion for isocyanate-crosslinked adhesives according to claim 1, wherein the aromatic vinyl monomer is styrene.

8. The water-based polymer dispersion for isocyanate-crosslinked adhesives according to claim 1, wherein the (meth)acrylate monomer comprises at least one monomer selected from the group consisting of butyl acrylate, 2-ethylhexyl acrylate, methyl methacrylate, butyl methacrylate, and cyclohexyl methacrylate.

9. The water-based polymer dispersion for isocyanate-crosslinked adhesives according to claim 1, wherein the crosslinkable monomer comprises at least one monomer selected from the group consisting of trimethyloipropane triacrylate, trimethylolpropane trimethacrylate, γ-acryloxypropyltnimethoxysilane, and γ-methacryloxypropyltnimethoxysilane.

10. The water-based polymer dispersion for isocyanate-crosslinked adhesives according to claim 1, wherein the hydroxyl group-containing vinyl monomer comprises at least one monomer selected from the group consisting of hydroxyethyl acrylate and hydroxyethyl methacrylate.

11. The water-based polymer dispersion for isocyanate-crosslinked adhesives according to claim 1, wherein the ethylenically unsaturated carboxylic acid monomer comprises at least one monomer selected from the group consisting of methacrylic acid, acrylic acid, and itaconic acid.

12. The water-based polymer dispersion for isocyanate-crosslinked adhesives according to claim 1, wherein the mass ratio of the polymer (1)/polymer (2) is 30/70 to 70/30 .

13. The water-based polymer dispersion for isocyanate-crosslinked adhesives according to claim 1, wherein the polymers (1) and (2) form particles having an average particle size of 250 to 550 nm.

14. The water-based polymer dispersion for isocyanate-crosslinked adhesives according to claim 1, wherein the Tg difference is 40 to 60° C.

* * * * *